(12) United States Patent
Leimann

(10) Patent No.: US 9,841,097 B2
(45) Date of Patent: Dec. 12, 2017

(54) METHOD FOR PROTECTING FROM DAMAGE DURING TRANSPORT OF TRANSMISSIONS

(71) Applicants: ZF FRIEDRICHSHAFEN AG, Friedrichshafen (DE); ZF WIND POWER ANTWERPEN N.V., Lommel (BE)

(72) Inventor: Dirk Leimann, Edegem (BE)

(73) Assignees: ZF Friedrichshafen AG, Friedrichshafen (DE); ZF Wind Power Antwerpen N.V., Lommel (BE)

( * ) Notice: Subject to any disclaimer, the term of this patent is extended or adjusted under 35 U.S.C. 154(b) by 191 days.

(21) Appl. No.: 14/759,438

(22) PCT Filed: Jan. 7, 2014

(86) PCT No.: PCT/EP2014/050110
§ 371 (c)(1),
(2) Date: Jul. 7, 2015

(87) PCT Pub. No.: WO2014/121958
PCT Pub. Date: Aug. 14, 2014

(65) Prior Publication Data
US 2015/0337944 A1    Nov. 26, 2015

(30) Foreign Application Priority Data

Feb. 7, 2013   (DE) .................. 10 2013 202 044

(51) Int. Cl.
*F16H 57/00*   (2012.01)
*F16H 57/023*   (2012.01)

(52) U.S. Cl.
CPC ........... *F16H 57/00* (2013.01); *F16H 57/023* (2013.01); *F16H 2057/0093* (2013.01); *Y10T 29/49819* (2015.01); *Y10T 74/19637* (2015.01)

(58) Field of Classification Search
CPC ......... F16H 57/023; F16H 2057/02078; F16H 2057/0093
See application file for complete search history.

(56) References Cited

U.S. PATENT DOCUMENTS

| 3,213,968 A | 10/1965 | Platz |
| 2005/0097985 A1 | 5/2005 | Kato |
| 2007/0157759 A1* | 7/2007 | Englund ................. F16H 48/08 74/606 R |

FOREIGN PATENT DOCUMENTS

| DE | 337 595 | 7/1919 |
| DE | 1 264 973 | 3/1968 |

(Continued)

OTHER PUBLICATIONS

German Search Report Corresponding to 10 2013 202 044.9 dated Sep. 27, 2013.

(Continued)

*Primary Examiner* — Jacob S Scott
(74) *Attorney, Agent, or Firm* — Davis & Bujold, PLLC; Michael J. Bujold

(57) ABSTRACT

A method for protecting transmissions against damage during transport, in that at least one transmission component located in the force flow is braced in itself. Thereafter, transporting the transmission to a desired site and then removing the brace to free the drive input and the drive output shafts.

11 Claims, 2 Drawing Sheets

(56) References Cited

FOREIGN PATENT DOCUMENTS

| DE | 1 933 812 | 3/1971 |
|---|---|---|
| DE | 2 223 067 | 11/1973 |
| DE | 42 15 780 A1 | 11/1993 |
| DE | 100 31 472 C1 | 4/2002 |
| DE | 10 2007 035 777 A1 | 2/2009 |
| DE | 10 2007 047 899 A1 | 6/2009 |
| DE | 10 2008 000 404 A1 | 8/2009 |
| DE | 10 2013 002 189 A1 | 8/2013 |
| EP | 0 985 854 A2 | 3/2000 |
| EP | 1 798 448 A1 | 6/2007 |

OTHER PUBLICATIONS

International Search Report Corresponding to PCT/EP2014/050110 dated Mar. 28, 2014.
Written Opinion Corresponding to PCT/EP2014/050110 dated Mar. 28, 2014.

\* cited by examiner

METHOD FOR PROTECTING FROM DAMAGE DURING TRANSPORT OF TRANSMISSIONS

This application is a National Stage completion of PCT/EP2014/050110 filed Jan. 7, 2014, which claims priority from German patent application serial no. 10 2013 202 044.9 filed Feb. 7, 2013.

FIELD OF THE INVENTION

The present invention concerns a method for protecting transmissions against damage during transport and a transmission.

BACKGROUND OF THE INVENTION

Transmissions serve to transform a torque applied to the drive input shaft of the transmission into a torque delivered by the transmission by way of a drive output shaft. Such transmissions are for example used in wind power machines to be able to change the slow rotational movement of the rotor into a fast rotational movement as needed by the generator.

Torque transfer transmissions, as part of a device such as a wind power machine, are often manufactured by specialized companies. To be able to fit the transmission into the device such as the wind power machine as a whole, the transmission often has to be transported over long distances from the place where it is manufactured to the location where the device as a whole is assembled. During transport the transmission can be damaged, which incurs high costs.

SUMMARY OF THE INVENTION

The purpose of the present invention is to enable transmissions to be transported in a better and/or safer manner.

This objective is achieved by a method and a transmission as described below.

Preferred embodiments emerge from the drawings.

In particular, the objective is achieved by a method for protecting transmissions from damage during transport, wherein at least one moving component in the force flow is braced in itself.

A transmission is in general understood to be a device that serves to transform torque, rotational direction and/or rotational speed. Such a transmission can be used to transmit the rotational movement of a drive input shaft, appropriately geared, to the drive output shaft. The transmission can be used in a wind power machine wherein the drive input shaft is connected directly or indirectly to the rotor and the drive output shaft is connected directly or indirectly to the generator. Transmissions can also be used in a vehicle wherein the drive input shaft is connected to an electric machine or an internal combustion engine and the drive output shaft passes the torque on to the drive wheels.

A transmission is in particular taken to be a planetary gear set, in particular a one- to three-step planetary gear set. These transmissions can also have only one gear ratio. However, in the context of the invention a transmission can also mean a spur gear set, a chain transmission and suchlike, or combinations of the above-mentioned transmissions.

A drive input shaft can also be understood to mean the slow shaft and the drive output shaft can mean the fast shaft, i.e. the shaft whose rotational speed is higher relative to the other shafts.

A moving transmission component is understood in what follows to mean a component which moves in whole or only in part when the drive input shaft and/or the drive output shaft are moving. A moving transmission component can be a shaft, a gearwheel, a chain, a belt, a bearing or the like.

In what follows, a transmission component in the force flow can be understood to mean a component of the transmission upon which a force acts when torque is applied to the drive input shaft. Such a transmission component can be a gearwheel such as a sun gear, a planetary gearwheel, a planetary carrier or a ring gear, a shaft such as a drive input shaft, a drive output shaft, a sun gear shaft, a planetary gearwheel shaft, a planetary carrier shaft and/or a ring gear shaft, or a bearing such as a ball bearing, a conical roller bearing or a slide bearing.

In what follows, a transmission component can be said to be braced if a force acts on the transmission component such that the transmission component is prevented from moving. In such a case the transmission component as a whole or only part of the transmission component can be prevented from moving. Furthermore, by means of the force the transmission component or part thereof can be prevented from moving in one direction, in several directions, but preferably in all directions.

In particular a component can be considered to be braced if the component or part thereof is pressed against a fixed component or fixed components and in that way prevented from moving.

It has been recognized that during transport a transmission can be damaged by an uncontrolled movement of the transmission or a component thereof. In particular, this can also apply to bearings such as roller bearings or slide bearings. It has also been recognized that by virtue of a force introduced into the transmission a transmission component, located for example inside the transmission, can be braced and so prevented from moving. Such a component can be, for example, a bearing such as a slide bearing or a roller bearing, which for example supports a shaft or axle of the transmission.

It has also been recognized that when a force is introduced into the transmission, this force at least partially deforms the transmission elastically and the transmission therefore exerts an opposing force. The opposing force can then be used to prevent components of the transmission from moving.

Preferably, the drive output shaft is rotated in such manner that at least one moving transmission component located in the force flow is braced in itself. In particular this component in the force flow is braced by rotating the drive output shaft before transport.

By applying torque to the drive output shaft, the torque is introduced into the transmission. If now the drive input shaft is prevented from moving in response to the torque on the drive output shaft, the transmission is locked and a transmission component located in the force flow is acted upon by a force. In this way several transmission components or even all the transmission components in the force flow can be acted upon by forces. By virtue of the forces the corresponding transmission components can be prevented from moving, and this prevents the components from being mechanically damaged due to the movement.

Preferably, the transmission is in a fast gear ratio, wherein the drive output shaft is easier to rotate than the drive input shaft so that the transmission can be braced more easily. In this way the drive output shaft can be rotated without elaborate technical means of assistance, and this further facilitates the process.

The drive input shaft is understood to be the slow shaft, whereas the drive output shaft is the fast shaft, i.e. the shaft whose rotational speed is higher relative to the other shafts.

It is also possible to rotate the drive input shaft alone, or both shafts, in order to apply a torque in the transmission.

Preferably, in a first step the drive input shaft is locked relative to the housing and in a second step the drive output shaft is rotated. Preferably, the drive output shaft is rotated until the torque required for any further rotation is greater than a defined torque threshold. In this way the drive input shaft can be prevented from moving, for example by fixing the drive input shaft to the transmission housing or to the torque support. This fixing can be carried out without moving the drive input shaft, which is difficult to move. The two steps can also be carried out at the same time, or partly staggered.

After the drive output shaft has been rotated, the drive output shaft is secured against further rotation, in particular by locking with a fastening means.

The drive output shaft can also be locked relative to the housing by fastening means, and the drive input shaft rotated. In particular, during this a transmission component in the forced flow is braced thereby. Preferably, after being rotated the drive input shaft is secured against further rotation.

In particular, the bracing of the transmission can be released by releasing the slow-moving shafts. It has also been recognized that the bracing of the transmission exerts a restoring force on the drive input and the drive output shafts. This restoring force acts in opposition to the direction in which the shaft has been rotated. If now the drive input and/or the drive output shaft is released, the shaft concerned moves under the action of the restoring force.

The invention also concerns a transmission comprising a drive input shaft, such that the transmission has at least one fixing means for locking the drive input shaft and/or the drive output shaft.

In particular, by virtue of a locked drive input shaft and a locked drive output shaft at least one moving component located in the force flow can be braced in itself.

BRIEF DESCRIPTION OF THE DRAWINGS

Below, the invention is explained further with reference to example embodiments with the aid of the drawings, which show.

DETAILED DESCRIPTION OF THE PREFERRED EMBODIMENTS

Figure 1:
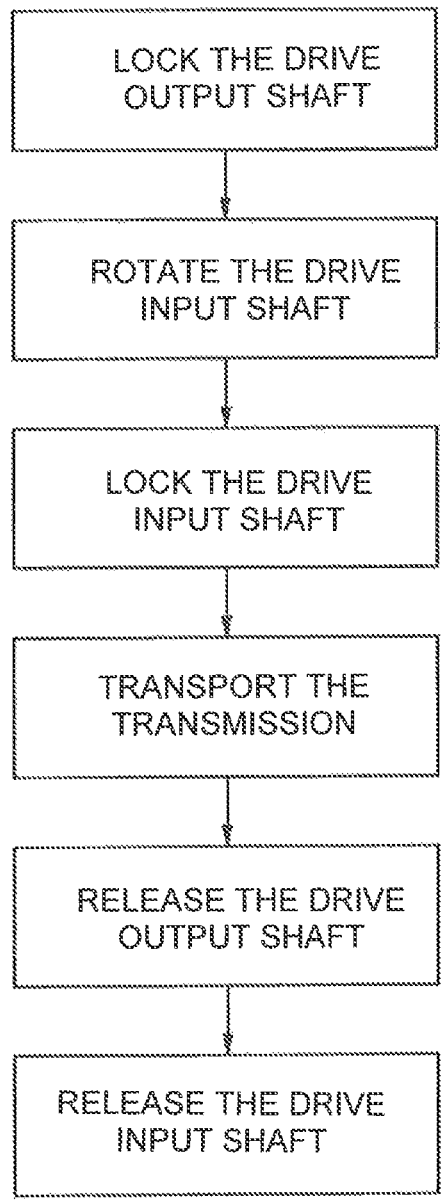
FIG. 1: A process sequence.

FIG. 1 shows a flow diagram of the process sequence of an example embodiment of a method for protecting transmissions against damage. The transmission has a drive input shaft and a drive output shaft, wherein the drive input shaft is connected to the drive output shaft in such manner that when the drive input shaft rotates, so too does the drive output shaft. In a first step of the method, the drive output shaft is locked, i.e. prevented from moving relative to the housing of the transmission. This can be done by mechanically connecting the drive output shaft to some other component, but preferably the drive output shaft is connected detachably to the housing.

Thus, on the drive output shaft there can be arranged a lever arm that extends radially relative to the drive output shaft. At its end remote from the drive output shaft, the lever arm can be supported against the transmission housing, in particular against the torque support.

In a second process step, the drive input shaft is rotated relative to the locked drive output shaft, so that any transmission components in the force flow are themselves braced. The transmission components are therefore prevented from moving.

In a third process step, the drive input shaft is locked, in particular connected to the housing in such manner that the movement of the drive input shaft is braked, in particular prevented. It is also not necessary for the drive input shaft to be connected to the housing, but the drive input shaft can even be connected to some other component, even one belonging to a transport device, that prevents movement of the drive input shaft.

Instead of locking the drive input shaft and the drive output shaft relative to the transmission housing, the drive input shaft can also be connected to the drive output shaft in a rotationally fixed manner so that the transmission as such is blocked. In this case one or both of the connections to the transmission housing can be omitted.

If the drive input shaft and the drive output shaft are blocked, the transmission can be transported, for example in a transporter.

At the destination the drive output shaft can now be released, so that it can again move freely relative to the housing. In a sixth step the drive input shaft is released, so that the drive input shaft can rotate relative to the housing.

Figure 2:
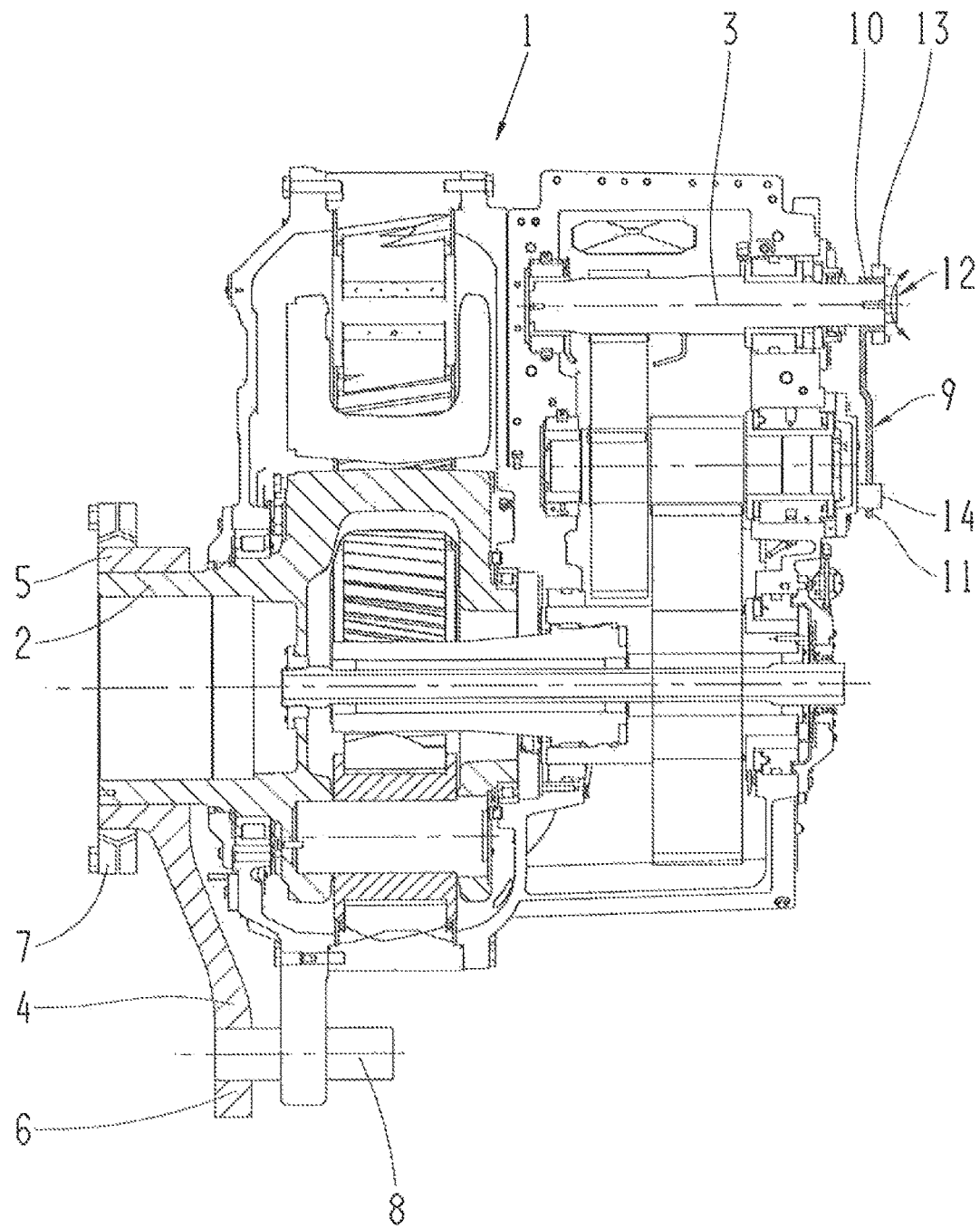
FIG. 2: A transmission, which is secured for transport.

FIG. 2 shows a transmission 1, in particular a transmission for a wind power machine. This transmission 1 comprises a drive input shaft 2 and a drive output shaft 3. In this case provision is made for connecting the drive input shaft 2 mechanically to the rotor of a wind power machine and the drive output shaft 3 to a generator. The drive input shaft 2 is connected to the drive output shaft 3 by way of at least one torque transformation element, such as a planetary or a spur gear transmission. On the drive input shaft 2 is arranged a lever 4, which extends radially away from the drive input shaft 2. On its drive input shaft side, the lever 4 has a fixing element 5, which is in contact with the drive input shaft 2 and by means of which the lever 4 can be fixed onto the drive input shaft 2. The fixing element 5 has a closed shape, for example a ring shape. The fixing element 5 is connected to a lever arm 6, such that the lever arm 6 extends radially from the fixing element 5. Around the fixing element 5 is arranged a shrink-disk 7, so that the fixing element presses onto the drive input shaft held in the fixing element. In a position in which the transmission 1 is blocked so that the transmission can be transported, the end of the lever arm 6 remote from the drive input shaft rests against a torque support 8 of the transmission or is attached thereto.

On the drive output shaft 3 a bolt head, for example of hexagonal shape, is fixed at the end. By virtue of the bolt head a power driver, such as a compressed-air driver, can be fitted onto the drive output shaft in order to move the drive output shaft, in particular relative to the fixed drive input shaft, so that the transmission is braced. In such a case the power driver can comprise means for limiting the torque so that the transmission is not damaged by the bracing process.

In addition a lever element 9 is arranged on the drive output shaft 3, the lever element consisting of a fixing element 10 and a lever arm 11. The fixing element 10 encloses the drive output shaft 3 radially, the fixing element 10 having a closed or nearly closed shape such as a circle or part-circle. Around the fixing element 10 is fitted a shrink-disk 13 to press the fixing element 10 onto the drive output shaft 3. On the fixing element 10 there is attached a lever arm 11, which extends radially from the drive output shaft 3. At the end of the lever arm 11 remote from the drive output shaft 3, the lever arm 11 rests against or is attached to a projection 14 of the transmission housing.

The invention claimed is:

1. A method for protecting a transmission against damage during transport thereof, the method comprising:
    locking one of a drive input shaft and a drive output shaft of the transmission relative to a transmission housing;
    rotating the other one of the drive input shaft and the drive output shaft of the transmission to brace at least one moving component of the transmission located in a force flow to prevent rotation of the at least one moving component during transportation; and
    transporting the transmission.

2. The method according to claim 1, further comprising providing the transmission with the drive input shaft and the drive output shaft.

3. The method according to claim 2, further comprising connecting one end of a lever arm to at least one of the drive input shaft and the drive output shaft such that the lever arm extends radially relative to the at least one of the drive input shaft and the drive output shaft; and
    supporting a remote end of the lever arm against the transmission housing to brace the at least one moving component of the transmission, located in the force flow.

4. The method according to claim 1, further comprising locking the drive input shaft relative to the transmission housing and rotating the drive output shaft such that the at least one moving component of the transmission located in the force flow is braced.

5. The method according to claim 2, after bracing the at least one moving component of the transmission located in the force flow, further comprising securing the drive output shaft against rotation.

6. The method according to claim 1, further comprising locking the drive output shaft relative to the transmission housing and rotating the drive input shaft so that the at least one moving component of the transmission, located in the force flow, is braced.

7. The method according to claim 2, further comprising securing the drive input shaft against rotation after bracing the at least one moving component of the transmission that is located in force flow.

8. The method according to claim 1, further comprising after transport of the transmission, releasing the braced at least one moving component of the transmission, located in the force flow, by releasing the drive input shaft.

9. A transmission comprising a drive input shaft, the transmission comprising at least one locking element for locking at least one of the drive input shaft and a drive output shaft during transport of the transmission, and
    the drive input shaft and the drive output shaft are lockable, and when at least one of the drive input shaft and the drive output shaft is locked, the locked at least one of the drive input shaft and the drive output shaft has a restoring force which biases the at least one of the drive input shaft and the drive output shaft to a position which is different from a position in which the locked at least one of the drive input shaft and the drive output shaft is located.

10. The transmission according to claim 9, wherein the drive input shaft and the drive output shaft are lockable such that when the drive input shaft and the drive output shaft are locked, at least one component located in force flow is braced.

11. A method for protecting a transmission against damage during transport thereof, the transmission having drive input and output shafts and at least one transmission component which facilitate a flow of force through the transmission from the drive input shaft to the drive output shaft, the method comprising steps of:
    fixing a first one of the drive input and the drive output shafts, via a fixing element, to a housing of the transmission to prevent rotation thereof;
    rotating a second one of the drive input and the drive output shafts to apply torque to the at least one transmission component and the first one of the drive input and the drive output shafts;
    securing the second one of the drive input and the drive output shafts against rotation with a fastening element;
    transporting the transmission; and
    following transport of the transmission, releasing both the fixing and the fastening elements to free the drive input and the drive output shafts.

* * * * *